United States Patent [19]

van der Lely

[11] Patent Number: 5,596,945
[45] Date of Patent: Jan. 28, 1997

[54] CONSTRUCTION FOR AUTOMATICALLY MILKING ANIMALS

[76] Inventor: Cornelis van der Lely, Bruschenrain 7, CH-6300, Zug, Switzerland

[21] Appl. No.: 265,261

[22] Filed: Jul. 1, 1994

Related U.S. Application Data

[63] Continuation of PCT/NL93/00223, Nov. 1, 1993, published as WO94/00616, May 11, 1994.

[51] Int. Cl.⁶ .................................................. A01K 1/12
[52] U.S. Cl. .................................................. 119/14.03
[58] Field of Search ..................... 119/14.03, 14.08, 119/14.1, 16, 20, 859

[56] References Cited

U.S. PATENT DOCUMENTS

| | | | |
|---|---|---|---|
| 2,740,377 | 4/1956 | Duncan | 119/14.03 |
| 2,843,085 | 7/1958 | McKee | 119/16 |
| 4,445,460 | 5/1984 | Stencil | 119/20 |
| 4,805,557 | 2/1989 | van der Lely et al. | 119/14.1 X |
| 4,936,256 | 6/1990 | Pera | 119/14.08 |

FOREIGN PATENT DOCUMENTS

| | | |
|---|---|---|
| 0091892A3 | 10/1983 | European Pat. Off. . |
| 0189954A1 | 8/1986 | European Pat. Off. . |
| 0360354A1 | 3/1990 | European Pat. Off. . |
| 0389013A1 | 9/1990 | European Pat. Off. . |
| 0432148A3 | 6/1991 | European Pat. Off. . |
| 2523809 | 9/1983 | France | 119/859 |
| 2598236 | 11/1987 | France . |
| 1158016 | 7/1969 | United Kingdom . |
| 2218888 | 11/1989 | United Kingdom . |

*Primary Examiner*—Robert P. Swiatek
*Attorney, Agent, or Firm*—Penrose Lucas Albright

[57] ABSTRACT

A construction for automatically milking animals, such as cows, comprising a milking parlor with a milking robot and a covered area where the animals can move freely about. The construction further includes a system of one-way portals, e.g., doors and gates, which open in one direction to define a path from the milking parlor through the covered area and finally back to the milking parlor. The covered area may also be adjacent to an enclosed pasture divided into a plurality of enclosed regions connected to the covered area and to each other by one-way portals, thus defining a path leading from the milking parlor through the enclosed area through each region of the pasture back to the covered area and to the milking parlor. The milking parlor includes two adjacently arranged milking compartments. The milking robot is installed between the compartments so as to be movable from one to the other under the udder and teats of an animal therein whereby an animal is first milked in a compartment on one side, and then on the other compartment, from the other side. Also installed between the compartments is a mechanism for automatically cleaning the animal's udder and teats before they are milked and while an animal in the other compartment is being milked.

37 Claims, 6 Drawing Sheets

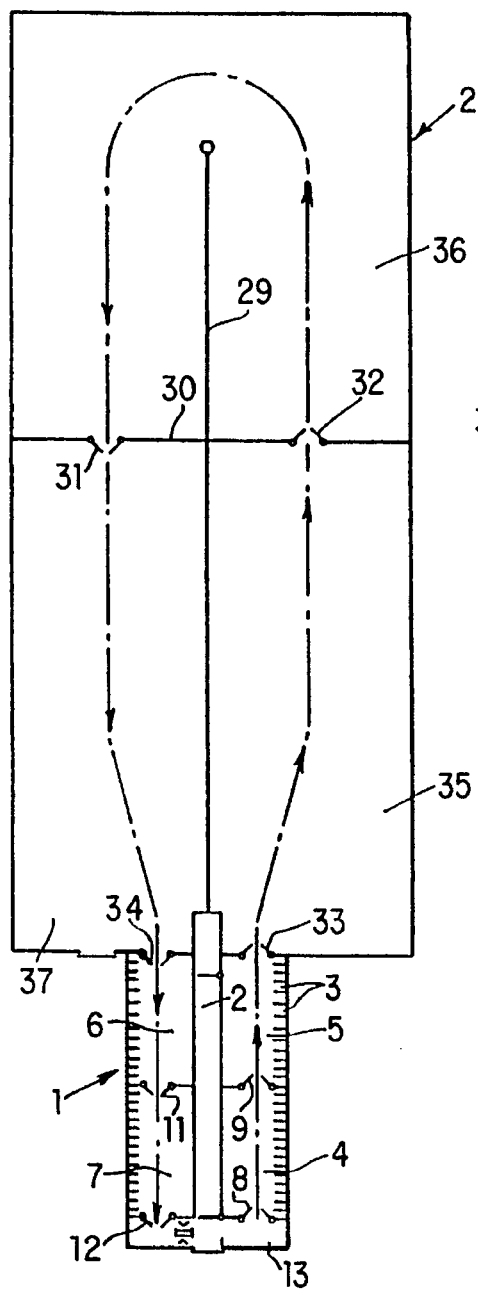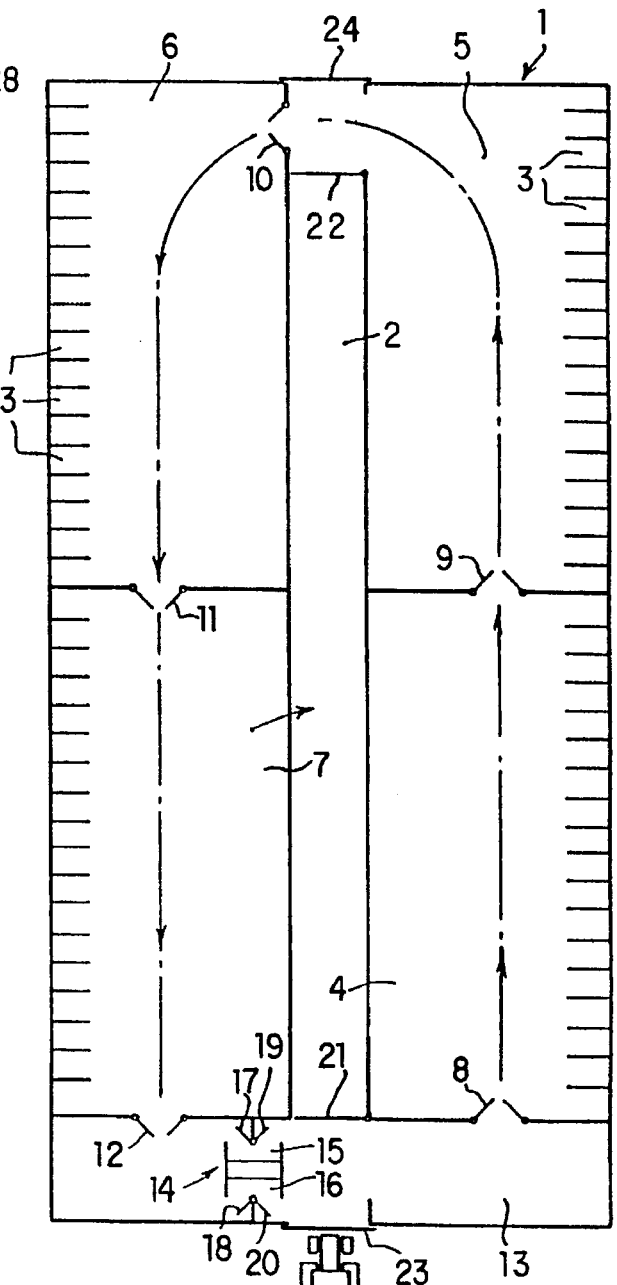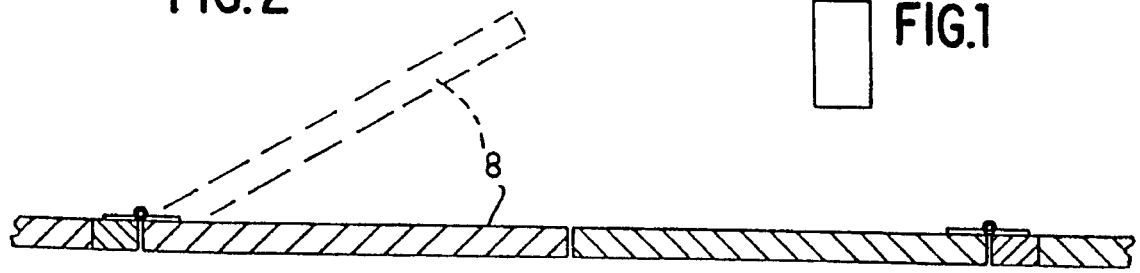

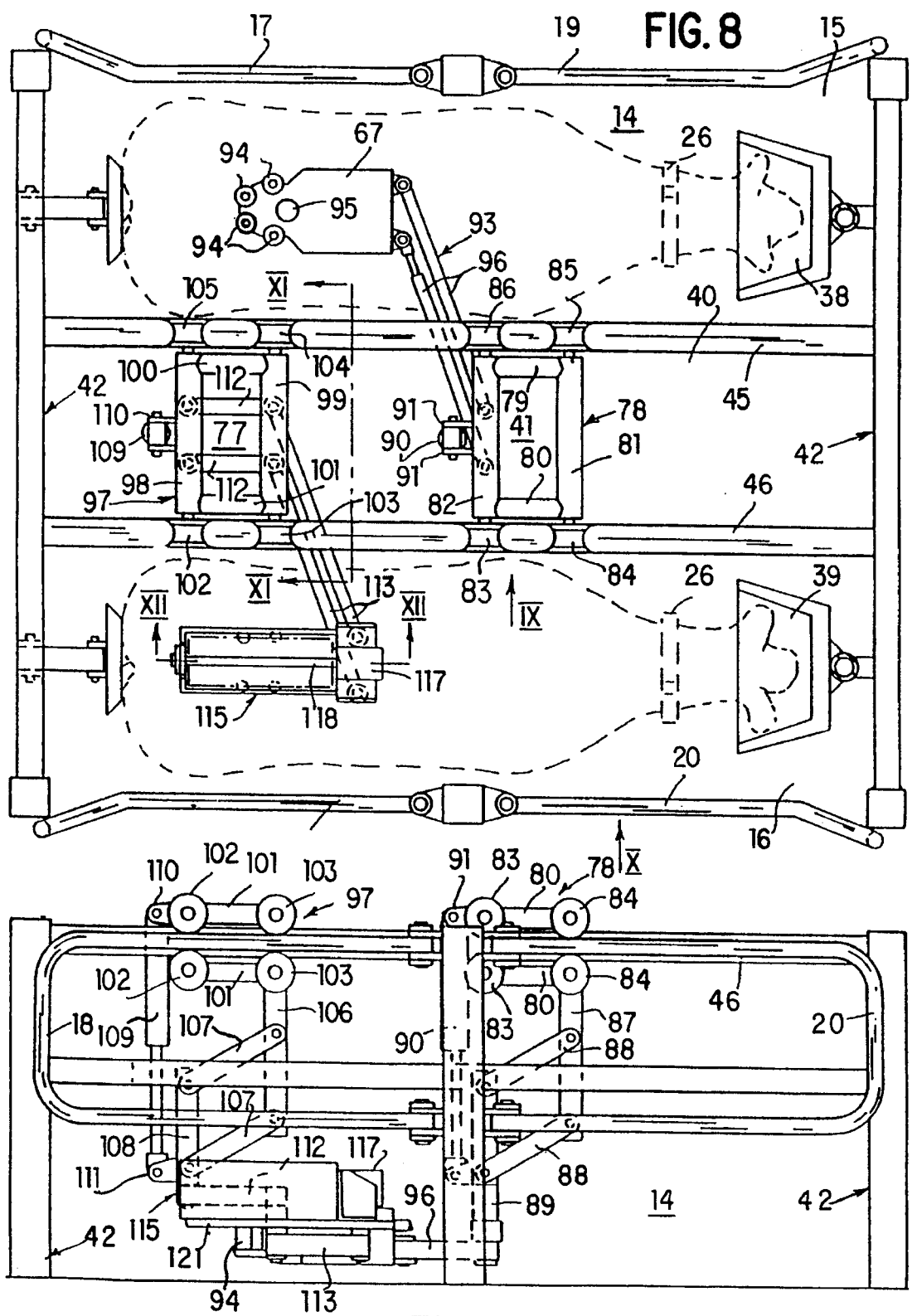

5,596,945

CONSTRUCTION FOR AUTOMATICALLY MILKING ANIMALS

RELATED APPLICATIONS

This Patent Application is a Continuation of PCT/NL93/00223, filed Nov. 1, 1993 designating the United States, which claims the priority dates of The Netherlands' Patent Application 9201902, filed Nov. 2, 1992 and The Netherlands' Patent Application 9300307, filed Feb. 18, 1993.

FIELD OF THE INVENTION

The present invention relates to a construction for automatically milking animals, such as cows, comprising a milking stall or parlor having two side-by-side stalls or compartments with a milking robot and an area where the animals can freely move about.

BACKGROUND AND SUMMARY OF THE INVENTION

In order to milk and feed the animals in an efficient manner, the construction in accordance with the invention is characterized in that, in the area where the animals can move freely, it includes a system of portals including doors, gates or similar means which open in one direction for defining the path and the direction in which the animals can walk to the milking stall or compartment. Dual doors, gates or similar means in accordance with the invention comprise entry means via which animals can go from one area, e.g., a shed or a pasture, to another shed or pasture. The expression "which open in one direction" refers to the direction in which the animals can pass through such openings.

When animals are being automatically milked, it is important that between consecutive milkings the animals feel comfortable. Hence, the invention also relates to a construction for automatically milking animals, such as cows, comprising a milking parlor having stalls or compartments arranged to receive a milking robot, and an area where the animals can move about freely, the construction being characterized in that the area includes a shed with cubicles for the animals, the shed furthermore being arranged so that the animals can optionally stay in a pasture adjacent to the shed or in the cubicles. By providing a system of doors or gates which open in one direction, it should be appreciated that the animals circulate through the shed and the pasture in one direction. Also, the shed, and optionally the pasture, can be subdivided into several areas so that it becomes possible to check on the progress of the animals' movement through the shed and optionally through the pasture to the milking robot, by counting the number of animals present in such a subdivided area or region at a given moment. To effect the desired progression by the animals through the shed and optionally through the pasture, the invention also relates to a construction for automatically milking animals, such as cows, comprising a milking parlor comprising one or two compartments arranged to receive a milking robot, and an area or region where the animals can freely move about, the construction then being characterized in that a radio system with aerial and loudspeaker is attached to each animal, which system operates in a manner so that, if too many animals are concentrated in one place, they are encouraged by sounds from the loudspeaker to move in one direction through the area, particularly a shed or a pasture adjacent thereto towards and to the milking robot.

When an animal finally reaches the milking parlor, having passed through various areas or regions on its way thereto, particularly through the shed and optionally through the pasture, the teats or udder or both must be cleaned before the animal is milked. Although several processes for cleaning the teats are known, the present invention provides a new manner of cleaning. To that end, the invention relates to a construction for automatically milking animals, such as cows, comprising a milking compartment having a milking robot, and an area in which the animals can freely move about, the construction then being characterized in that it includes a cleaning member for cleaning the teats of the animals, that is capable of rotating about a shaft which extends in the longitudinal direction of the stall.

To enable a fast and efficient milking of the animals, the milking parlor includes, according to the invention, at least two adjacently arranged milking compartments and the milking robot is installed so that the robot head can be received in the first compartment from one side and in the second compartment from another side. In a specific embodiment, the milking parlor comprises two compartments arranged beside each other, the milking robot entering the first compartment from a right-hand side and in the second compartment from a left-hand side. According to the invention, the construction is implemented whereby, during milking of a first animal in one compartment, a second animal can enter the other compartment. Thus it is achieved that both animals can be milked one after the other with the aid of the same set of teat cups. The milking robot is consequently being employed in an optimum manner.

In an advantageous embodiment, between the two milking box compartments there is present a straight guide, along which the milking robot is movable. This provides a set-up of the milking robot, which is extremely suitable to allow pivoting of the robot head into both compartments.

According to the invention, the milking robot has a frame which is movable along the straight guide and is adjustable in height, and to which the robot head is pivotably attached in boat milking compartments. With the aid of a first operating piston and cylinder, the frame can be moved along the straight guide. In an advantageous embodiment, the frame includes a first parallelogram structure which is operative in a substantial vertical plane and has a carrier, which is adjustable in height by a second operating piston and cylinder, for the robot head. Further there may be present a second parallelogram structure which is operative in a substantial horizontal plane and by means of which the robot head is pivotably connected to the carrier. Because of the movability of fire milking robot in the longitudinal direction passing between the two compartments, the adjustability in height of the robot head in each of the adjacent milking compartments, a milking robot set-up is obtained in which it becomes possible to move the robot head in an efficient manner to under the udder of the animal waiting in one of the compartments. The second parallelogram structure may include a third operating piston and cylinder for rotating the robot head about an upwardly directed shaft relative to the frame. This rotational feature, in combination with the lateral pivotal feature of the robot head and the motion of the robot head in the longitudinal direction of the milking parlor compartments, enables a positioning of the robot head under the udder in such a manner that the teat cups can be connected in an efficient manner, one after the other, by an upward motion to the teats of the animal present in the relevant compartment. For pivoting the robot head in the two compartments, a fourth operating; piston and cylinder is present, which is connected to the upwardly movable portion of the milking robot, and more in particular to the said carrier. To ensure that, independently of the position of the legs of the animal in a milking parlor compartment, the robot head can be moved without problems to under the animal's udder, it is, in accordance with the invention, advantageous when the construction includes one or more sensors for determining the distance of the robot head to one or more legs of an animal present in a milking parlor compartment. The sensor or sensors for the determination of the distance of the robot head to one or more legs of an animal present in a milking parlor compartment are preferably provided on the robot head itself. The sensor is preferably constituted by a laser telemeter. This laser telemeter may be provided on a laser trait located on the robot head for determining the position of the teats of an animal present in a milking parlor compartment.

In order to effect successive cleaning of the teats and milking of the animals in an efficient manner, it is also advantageous to utilize the dual parlor, i.e., a milking stall which comprises two adjacently arranged milking compartments. The invention therefore also relates to a construction for automatically milking animals, such as cows, comprising a milking parlor or milking compartments and a milking robot having a robot head which acts as a carrier for one or more teat cups, the construction then being characterized in that it includes a cleaning member for cleaning the teats of the animals, which is disposed in such a manner that it can pivot to a milking compartment on the one side and to a milking parlor compartment one the other side. By arranging both the milking robot proper and the cleaning member in such a manner that they are pivotal between the two milking compartments, it becomes possible to pivot the cleaning member to under the udder of an animal in one compartment and, during subsequent cleaning of the teats, to pivot the milking robot arm carrying the teat cups to under an animal present in the other compartment or to keep it there, so that cleaning of an animal can basically be effected simultaneously with milking of an other animal.

For a better understanding of the invention and to show how the same may be carried into effect, reference will now be made, by way of example, to the accompanying drawings, in which:

BRIEF DESCRIPTION OF THE DRAWINGS

FIG. 1 shows a lay-out of a shed with a milking parlor, it being possible to pass through the shed and the milking parlor compartment or compartments in one direction only;

FIG. 2 is a modified embodiment which includes the lay-out of a shed similar to that of FIG. 1 having, however, a pasture contiguous thereto, it being possible to pass through the shed with the milking parlor and the pasture in one direction only;

FIG. 3 is a cross-sectional plan view of a door which can open in one direction only, such as it is present in the shed, to ensure that the shed and the milking parlor can only be passed through in one direction;

FIG. 8 is a plan view of another embodiment of a milking parlor formed by two compartments, a milking robot and a cleaning member being arranged such as to be pivotal between the two compartments;

FIG. 10 is a rear elevational view of the milking robot as well as of the cleaning member arranged visibly in front thereof;

DESCRIPTION OF THE PREFERRED EMBODIMENT

Figure 11:
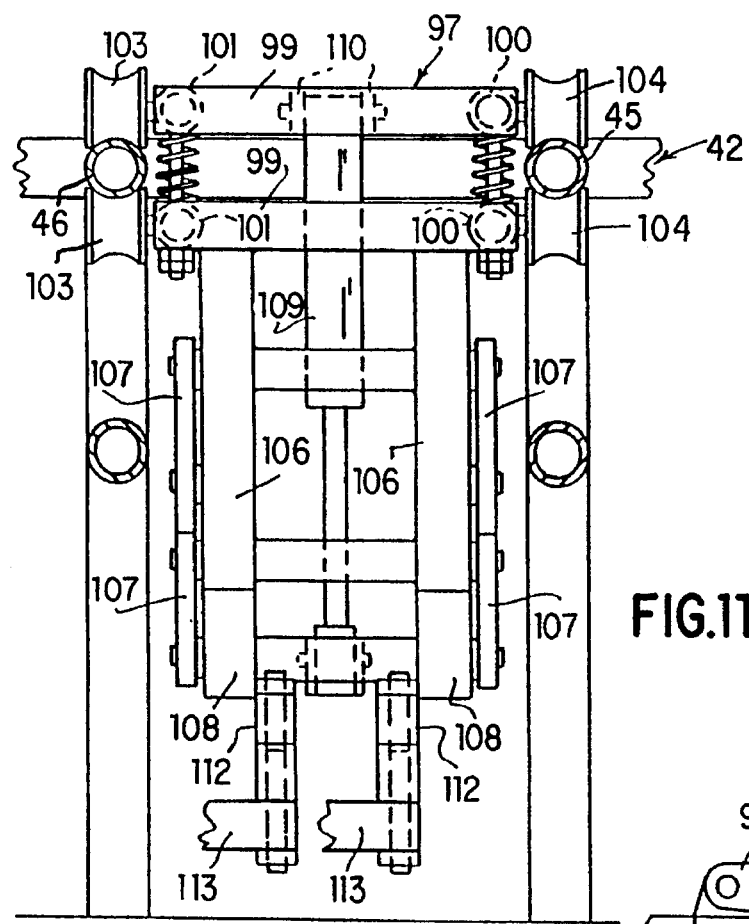
FIG. 11 is a front elevational view of the cleaning member in FIG. 8.

FIG. 1 shows a shed, particularly a housing 1, in which cows can move freely and in the longitudinal direction whereof a feeding area 2 is provided. Cubicles 3 are arranged on both sides of feeding area 2 through substantially the overall length of shed 1 along the inner side of the outer wall. Shed 1, which is split into two parts by feeding area 2, is in the present embodiment divided in its totality into four areas or regions 4, 5, 6 and 7. The animals present in shed 1 can reach these areas via portals comprising doors or gates 8, 9, 10, 11 and 12 which open in one direction only. FIG. 3 is a cross-sectional view of these doors. At one of the shorter sides of shed 1 there is an area 13, in which a dual a milking stall 14, i.e., a milking parlor formed by two compartments 15 and 16, is located. Compartments 15 and 16 of milking parlor 14 can be entered through corresponding doors 17 and 18, and these compartments can be exited through corresponding doors 19 and 20. The system of one-way doors defines the path and the direction in which the animals can walk through shed 1 and the milking parlor 14. Thus, the animals can proceed from area 4 through doors 9 to area 5, from there through doors 10 to area 6, through doors 11 to area 7 and through doors 12 to area 13, respectively, where milking parlor 14 is located, and from area 13 through doors 8 to area 4 again. The animals can push doors 8, 9, 10, 11 and 12 open in one direction. In addition, it is possible to open the doors under the control of a computer, to keep them open during a given period of time, or to close them; this will be described in greater detail hereinafter. In addition, shed 1 has doors 21 and 22 and, in the outer wall, doors 23 and 24, through which persons can reach feeding area 2 while animals are prevented from entering feeding area 2 from area 5 or from area 13. Through doors 23 and 21 or through doors 24 and 22, fodder can be brought into feeding area 2, optionally with the aid of a tractor. Gutters or troughs for fodder may then be provided on the partition between feeding area 2 and areas 4, 5, 6 and 7.

Figure 4:
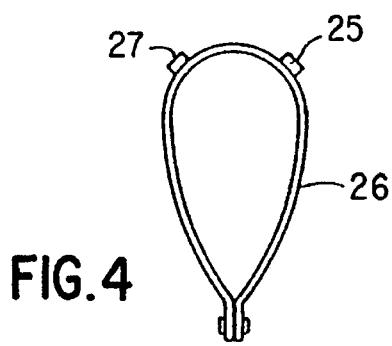
FIG. 4 is a from elevational view of a collar which, in addition to a cow identification system, is also provided with a radio system for encouraging the animal to pass through the shed and optionally the pasture on its way to the milking robot.

In order to realize a desired distribution of the total number of animals present in shed 1 over areas 4, 5, 6 and 7, it should first be determined how many animals are present in each area at a given moment. This can be effected by providing each one of doors 8, 9, 10, 11 and 12, which open in one direction, with a counting device for counting the animals which move from one area to another through a relevant door. The counting devices my be connected to a computer, in which the number of animals in a given area can permanently be updated. When at a given instant too many animals are present in a given area in proportion to the number of animals in the other areas, then steps can be taken to provide that animals go from this one area to the next area. This can be achieved by ensuring that the computer keeps the relevant doors open for such a long period of time as necessary for a number of animals in the area in front of these doors to go to the next area through the doors. When the computer has ascertained that a given number of animals have moved from one area to another, as a result of which the overall number of animals in the first area has decreased to such an extent that the number corresponds to the normally desired number in such an area, the doors can again be closed under the control of the computer. Instead of, or optionally in addition to, the system of computer-controlled doors, use can alternatively be made of a radio system 25, referring to FIG. 4, having an aerial and a loudspeaker, which system is attached to mats. This radio system then operates in such a manner that, if too many animals are present in a given location, animals are encouraged by sound from the loudspeaker to go in one direction through shed 1 from one area to another. Radio system 25 can be attached to a collar 26 which the animals normally wear, since collar 26 is used as a carrier for the electronics of a cow identification system 27. Cellar 26 is shown in FIG. 4 and can consequently also function as a carrier for the electronics, including a loudspeaker and an aerial, relevant to radio system 25. The aerial is preferably incorporated in its totality in collar 26 itself.

FIG. 2 again shows shed 1, the difference being that now pasture 28 is adjacent to shed 1. In its longitudinal direction, pasture 28 is provided for the major part with a railing, fence or similar enclosure means 29 and in the transverse direction with a partition 30 which includes doors 31 and 32 which open in one direction. Pasture 28 provides access to shed 1 via portals comprising doors 33 and 34 which open in one direction. From area 4 the animals can pass through doors 9 to area 5 and from there via doors 33 to sub-pasture 35, via doors 32 to sub-pasture 36, via doors 31 to sub-pasture 37, via doors 34 to area 6, via doors 11 to area 7, via doors 12 to area 13, in which milking parlor 14 is located, and from there via doors 8 again to area 4. Also in this situation, the animals can consequently pass through shed 1 and pasture 28 in only one (counterclockwise) direction.

Shed 1 may be suitable for the accommodation of approximately sixty cows, which are milked three times a day. Between the consecutive milking runs, the animals have a period of rest in shed 1 or the pasture 28 or both and a grazing period in pasture 28 of approximately seven hours, it being assumed that approximately one hour is needed for walking from the area or sub-pasture, in which an animal is present, to the area 13, in which milking parlor 14 is positioned, for the period of time an animal has to wait before being allowed to enter milking parlor 14, for cleaning and for the milking operation proper and for refining to the relevant area in shed 1 or to the relevant sub-pasture. The milking operation itself of the individual animals may take six to eight minutes.

Figure 5:
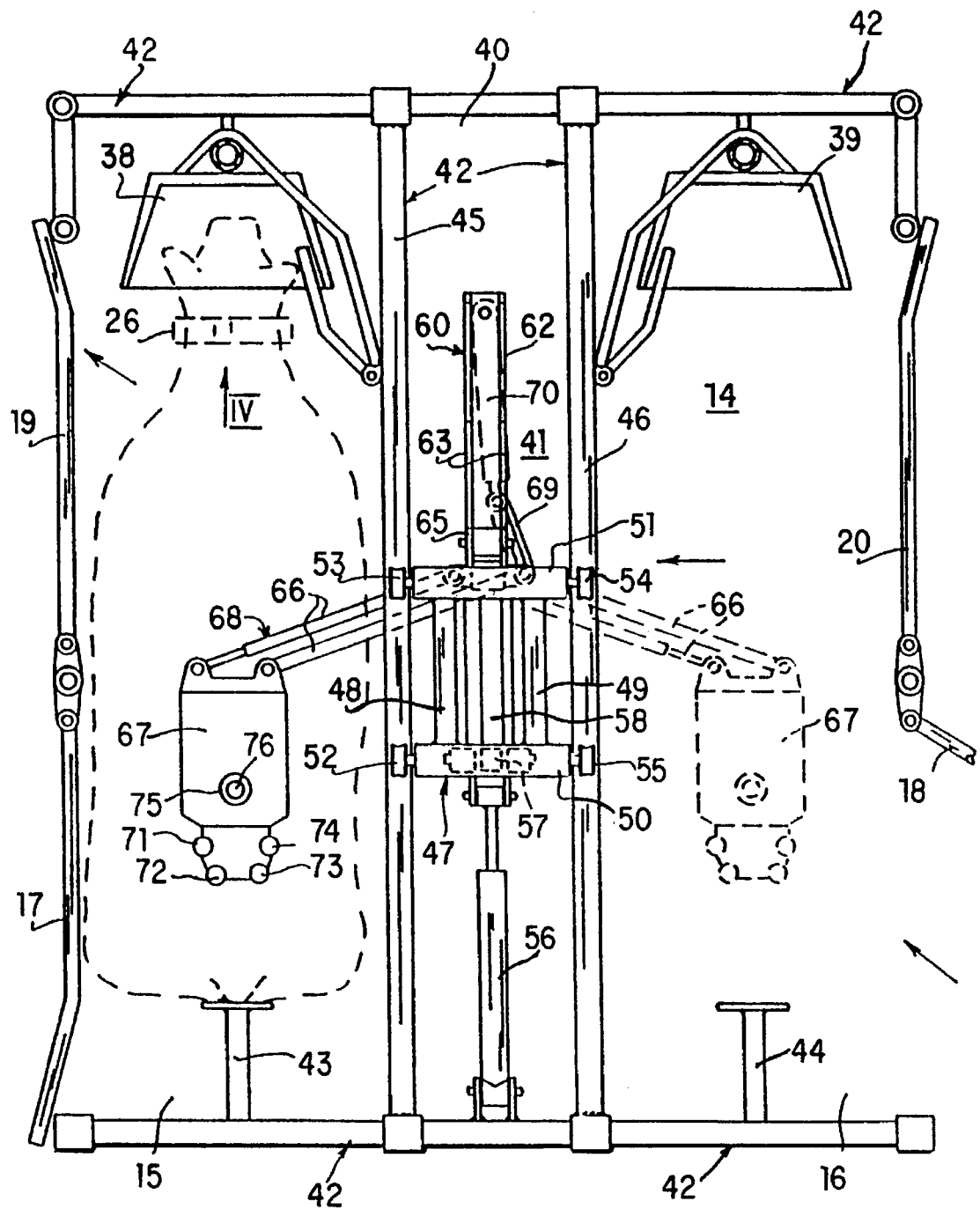
FIG. 5 is a plan view of a milking parlor formed by two compartments, a milking robot being arranged such as to be pivotal between the two compartments.

Milking parlor 14, such as illustrated in FIG. 5, is designed as a dual parlor, i.e., as a milking parlor which comprises two adjacently arranged milking stalls or compartments 15 and 16. Access to these compartments is obtained via doors 17 and 18, and the animals can be guided from the compartments through doors 19 and 20. Each of the compartments has an automatic feeding implement, of which feeder troughs 38 and 39 are shown in FIG. 5. By means of the feeding implement, an animal present in a milking compartment can be provided with an appropriate quantity of fodder during milking. Between two compartments 15 and 16 there is an intermediate space 40, in which a computer-controlled milking robot 41 is positioned. The computer itself is not further shown. The two compartments 15 and 16 are of such a design that they are each other's mirror image. The two compartments are assembled from a rail system 42, in which the two longitudinal sides of the two compartments are provided with doors 17, 18, 19 and 20 mentioned before. In addition, compartments 15 and 16 have means 43 red 44, respectively, which are shown only very schematically in FIG. 5, which have for their object to move and keep the animals to be milked to and in a somewhat strictly defined position in the milking stall.

Figure 6:
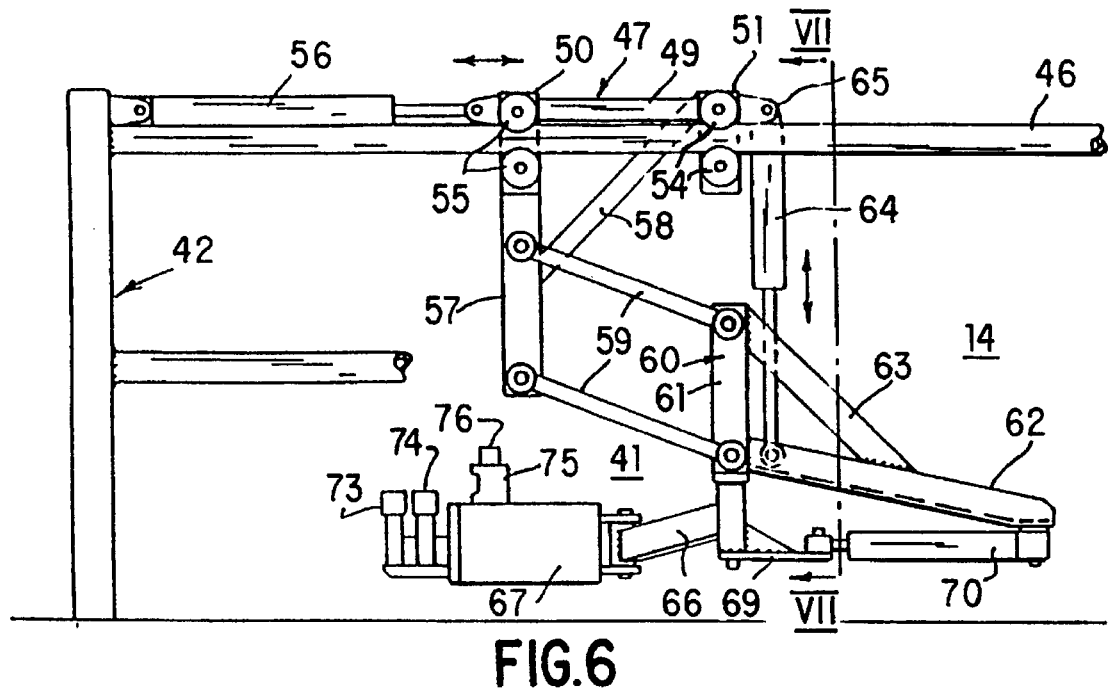
FIG. 6 is a partial side elevational view of the milking robot in FIG. 5.
Figure 7:
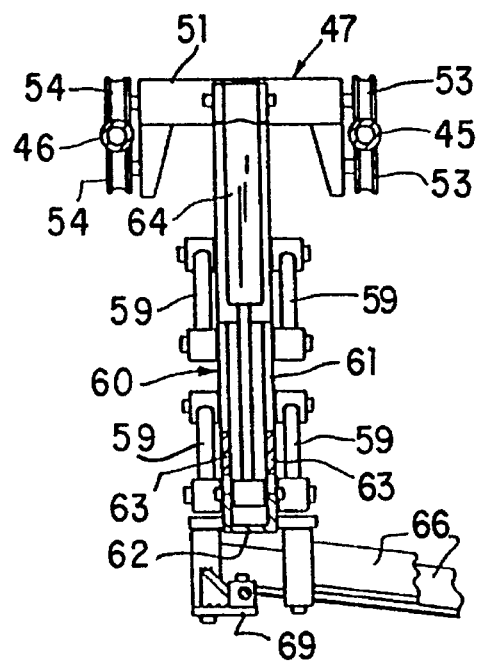
FIG. 7 is a rear elevational view of a portion of the milking robot in FIG. 5.

In the embodiment shown, milking robot 41 includes a frame 47 which is movable along two rails 45 and 46 which form part of rail system 42. Frame 47 is formed from cross-girders 50 and 51 which are interconnected by two beams 48 and 49 and at their two ends are provided with roller pairs 52, 53, 54 and 55, frame 47 being movable with the aid of these roller pairs in the longitudinal direction over rails 45 and 46 moving between two compartments 15 and 16. Frame 47 can be moved over rails 45 and 46 by means of a (first) operating piston and cylinder component 56 which has one side connected to the rearmost portion of rail system 42 and its other side to cross-girder 50 of frame 47. In the midway point of cross-girder 50 there is, rigidly connected to this cross-girder, a downwardly extending beam 57. Referring to FIG. 6, beam 57 is supported by a strut 58 arranged between beam 57 and cross-girder 51. A career 60 is connected to ate lower end of beam 57, via a first parallelogram structure 59 which is operative in a predominantly vertical plane. Carrier 60 includes a beam 61 which extends parallel to beam 57, a rearwardly and slightly downwardly directed beam 62 and a strut 63 disposed between beams 61 and 62. Career 60 can be moved up and down parallel to beam 57 by means of (second) operating piston and cylinder trait 64 arranged between a lug 65 connected to cross-girder 51 and beam 62 of carrier 60. Connected to the bottom side of carrier 60, and more specifically to the bottom side of beam 61 thereof, via a second parallelogram structure 66 which is operative in a predominantly horizontal plane, there is a robot head 67. Referring, again, to FIG. 5, since the leading and trailing points of rotation of this second parallelogram structure are located on an imaginary horizontal axis in the transverse direction of two compartments 15 and 16, a pivotal motion can be effected with the aid of second parallelogram structure 66, by means of which robot head 67 can be moved from one compartment to the other compartment and can then assume a substantially identical position in both compartments. By implementing one of the two connecting elements of second parallelogram structure 66 as a (third) operating piston and cylinder combination 68, the parallelogram formed by parallelogram structure 66 can be slightly moved, whereby a rotation of robot head 67 about an upwardly directed axis relative to frame 47 of milking robot 41 can be obtained. One of the rods of second parallelogram structure 66 is provided with a lever arm 69 arranged at a square angle thereto. Arranged between the free end of lever ann 69 and the leading end of beam 62 of carrier 60 there is a (fourth) operating piston and cylinder assembly 70, with the aid of which the, pivotal motion of robot head 67 can be realized. Because of the movability of milking robot 41 in the longitudinal direction between two compartments 15 and 16 with the aid of (first) operating piston and cylinder unit 56, the capability of moving up and down of carrier 60 (FIG. 6) with the aid of (second) operating piston and cylinder unit 64, the pivotability of robot head 67 from one compartment to the other with the aid of (fourth) piston and cylinder assembly 70 (FIG. 5) and the rotatability of robot head 67 about an upwardly directed axis with the aid of (third) operating piston and cylinder combination 68, a virtually optimum combination of motional features is created, which renders it possible to move robot head 67 in any desired position to under the udder of an animal to be milked. Robot head 67 acts as a carrier for four teat cups 71, 72, 73 and 74, whereas the carrier supports a laser unit 75 for determining the position of the teats of an animal present in a milking compartment. In order to control robot head 67 in such a manner that it can be moved to under the animal's udder without touching the animal's legs, the construction is provided with one or a plurality of sensors for determining the distance of robot head 67 to one or more legs of an animal standing in a milking compartment. Such a sensor, or such sensors, are preferably disposed on robot head 67 itself. In the present embodiment, there is only one such sensor, which is designed as a laser telemeter 76 and is positioned on laser unit 75. Since laser unit 75 for determining the position of the teats of art animal present in a milking compartment is arranged such as to be capable of rotation, as is extensively described in the European Patent Application No. 0 360 354, the motor employed for rotating laser unit 75 can also be used for rotating laser telemeter 76, so that only one such laser telemeter is sufficient. With the aid of the signals supplied by laser telemeter 76, operating pistons and cylinders 56, 64 (FIG. 6), 68 (FIG. 5) and 70 can now be controlled in such a manner via the computer that robot head 67 can be moved from a rest position between compartments 15 and 16, i.e. from a rest position in intermediate space 40, to under the animal's udder without touching the legs of the animal standing in a milking compartment, whereafter, by means of laser unit 75, the position of the animal's teats can accurately be determined and robot head 67 can be moved so that the teat cups can be connected to the teats of the animal by an upward motion. When an animal in compartment 15 has been milked, an animal to be milked thereafter is given the opportunity to enter compartment 16. After the animal has entered compartment 16, door 18 of this compartment can be closed and, as soon as the animal present in compartment 15 has been milked, robot head 67 can be pivoted from compartment 15 to under the udder of the animal standing in compartment 16 and the teat cups can then be connected to the teats of the animal then present in compartment 16. The other animal which has already been milked can then leave compartment 15 through door 19 and the compartment is then empty, so that a further animal to be milked can enter compartment 15 through door 17.

Although tails is not of immediate importance for the present invention, it will be obvious that the teat cups, before they are connected to the teats of a subsequent animal, can be cleaned prior thereto. This might be done by pivoting robot head 67 from one compartment to intermediate space 40, by connecting the teat cups in this intermediate space to a cleaning unit, and, after the teat cups have been cleaned, by continued pivoting of robot head 67 to the other compartment.

Figure 9:
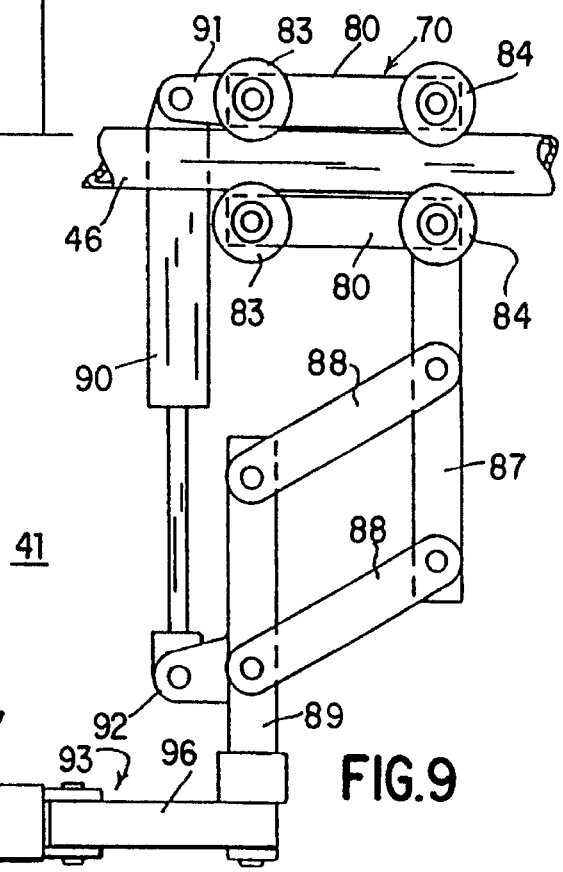
FIG. 9 is a side elevational view of a portion of the milking robot in FIG. 8.

In FIGS. 8, 9, 10, 11, 12 and 13, a second embodiment of a milking parlor with two compartments is shown, wherein besides a milking robot there is provided a cleaning member for the teats of an animal to be milked. Referring to FIG. 8, therefore, between compartments 15 and 16, in intermediate space 40, there is arranged in the rest position, besides milking robot 41, a cleaning member 77. In the embodiment shown, milking robot 41 includes a frame 78 which is movable over two rafts 45 and 46 which form part of rail system 42 of the two compartments. Frame 78 is formed by cross-beams 81 and 82 which are interconnected by beams 79 and 80 and at their two ends are fitted with pairs of rollers 83, 84, 85 and 86. Using these roller pairs, frame 78 can be moved in the longitudinal direction, passing between two milking compartments 15 and 16, over rails 45 and 46. This motion can, for example, be realized with the aid of an operating piston and cylinder combination, which has one side connected to the leading portion of rail system 42 and its other end to a cross-beam 81 of frame 78. This piston and cylinder combination is, however, now shown in the drawings. Referring to FIG. 9, in the midway point of lower cross-beam 81, downwardly extending beams 87 are present which are rigidly connected to this cross-beam. Connected to the lower end of beams 87 there are carriers 89 which with the aid of a parallelogram structure 88 operate in a predominantly vertical plane. Carriers 89 can be moved up and down parallel to beams 87 by means of an operating piston and cylinder unit 90 arranged between lugs 91 connected to upper cross-beam 82 and lugs 92 present on a beam between carriers 89. At the lower side of beams 89 there is a robot arm structure 93 with teat cups 94 and a sensor 95 for determining the position of the teats of an animal present in one of the compartments relative to the end of robot arm structure 93 where teat cups 94 are located. The end of robot arm structure 93 with teat cups 94 is movable in a horizontal plane in the manner described hereinafter, whereas robot arm structure 93 is movable in the vertical direction by means of piston and cylinder unit 90. Referring, again, to FIG. 8, robot arm structure 93 includes a parallelogram structure 96 which is pivotably connected to carriers 89 in FIG. 9. Again referring to FIG. 8, one of the arms of this parallelogram structure includes an operating piston and cylinder combination. As a result of the movement of frame 78 over rails 45 and 46, the pivotal motion to be performed with the aid of parallelogram structure 96 and the rotational capability of the end of robot arm structure 93 with the aid of the operating piston and cylinder combination associated with parallelogram structure 96, teat cups 94 can be moved in any position to under the udder of an animal present in a compartment. Milking robot 41 is of such a design that frame 78 is movable over the leading portion of rails 45 and 46, while parallelogram structure 96 is directed rearwardly, so that the end of robot arm structure 93 can be pivoted through between a front leg and a hind leg and can thereafter be moved to under the udder of the animal, more in particular in a position determined with the aid of sensor 95.

As has already been mentioned in the foregoing, not only milking robot 41 but also cleaning member 77 is located in intermediate space 40. In the embodiment shown, cleaning member 77 includes a frame 97 which is movable over rails 45 and 46. Frame 97 is formed from cross-beams 98 and 99 which are interconnected by beams 100 and 101 and at their two ends are provided with pairs of rollers 102, 103, 104 and 105. By means of these pairs of rollers, frame 97 can be moved in the longitudinal direction between two milking compartments 15 and 16 over rails 45 and 46. This motion can, for example, be realized with the aid of an operating piston and cylinder combination, which has one side connected to the rearmost portion of rail system 42 and the other side to a cross-beam 98 of frame 97. This piston and cylinder combination is, however, not shown in the drawings. Referring to FIG. 10, in the midway point of lower cross-beam 99, downwardly extending beams 106 are present which are rigidly connected to this cross-beam. Connected to the lower end of beams 106, with the aid of a parallelogram structure 107 which is operative in a predominantly vertical plane, there are carriers 108. Careers 108 can be moved up and down parallel to beams 106 with the aid of an operating piston and cylinder combination 109, which is disposed between lugs 110 connected to upper cross-beam 98 in FIG. 8 and lugs 111 connected to a beam between carriers 108. Referring to FIG. 11, attached to the bottom side of carriers 108 there is a double parallelogram structure which is formed by a first parallelogram structure 112 and a second parallelogram structure 113. A carrier 114 (see FIG. 12), on which the component parts of a cleaning element 115 are disposed, is present at the end of second parallelogram structure 113 in FIG. 8. Referring, again, to FIG. 8, by means of second parallelogram structure 113, cleaning element 115 can be pivoted from intermediate space 40 to under the udder of an animal located in one of compartments 15 or 16. By means of first parallelogram structure 112, second parallelogram structure 113 and in conjunction therewith cleaning element 115 can be moved to and from in a direction transversely to the longitudinal direction of a compartment. This motion renders it possible to reciprocate the cleaning member under the udder and thereby to increase the cleaning effect.

Figure 12:
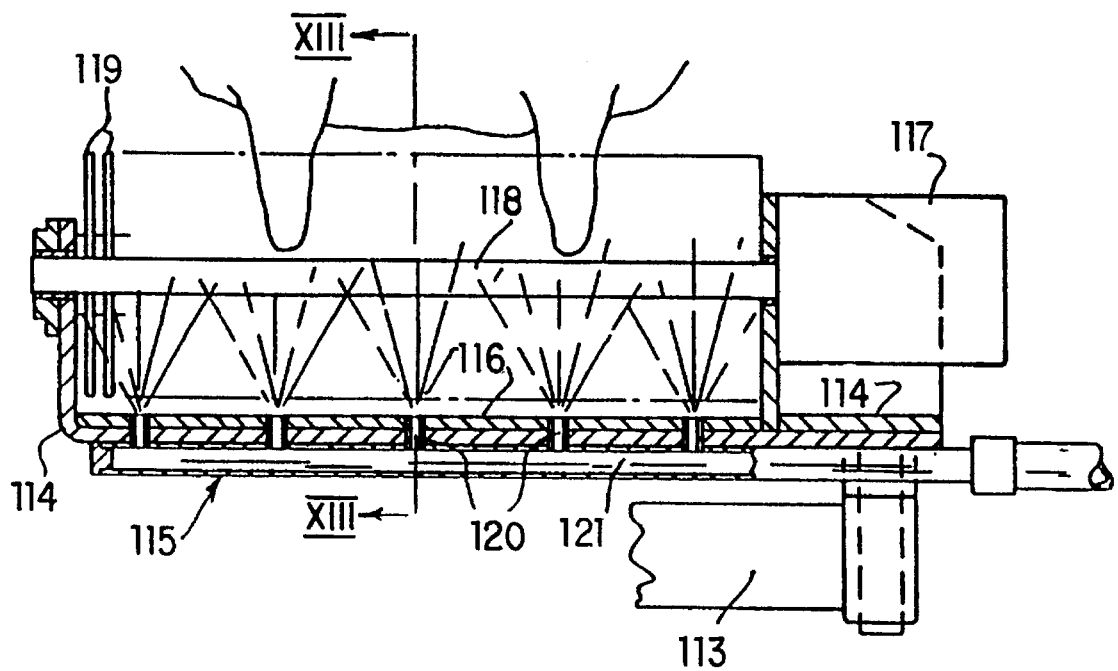
FIG. 12 is a longitudinal sectional view taken through the cleaning elements of the cleaning member.
Figure 13:
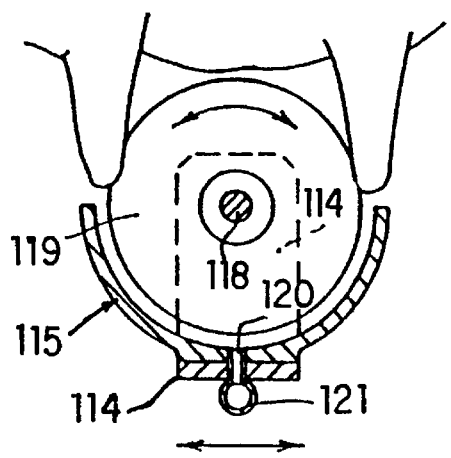
FIG. 13 is a transverse cross-sectional view of that portion of the cleaning member that is shown in FIG. 12.

Referring to FIG. 12, the cleaning member 115 comprises a container 116 which extends in the longitudinal direction of a compartment and a rod-like element 118 which is bearing-supported in the side walls of the container, and which is drivable by means of a motor 117 and is provided with textile discs 119. Rod-like element 118 with textile discs 119 is rotatable by means of motor 117 relative to the longitudinal direction of a milking compartment. Referring to FIG. 13, the textile discs 119 can rotate in two directions and during this rotary motion can be moved under the udder of an animal. Referring to FIG. 12, container 116 does not only function as a carrier for rotatable textile discs 119, but also as a water receptacle and is provided at its bottom side with a plurality of apertures 120 which are arranged in a row. A water supply line 121 is located at the bottom side of the water receptacle. Through this supply line, water can be sprayed into water receptacle 116, in order to clean the teats of an animal.

The present invention is not limited to the embodiments described in the foregoing, but also relates to all kinds of modifications thereof, insofar they are within the protective scope of the following claims. Alternatively more than two milking compartments may be used. These compartments can, for example, be arranged in two rows.

Having disclosed my invention what I claim as new and to be secured by Letters Patent of the United States is:

1. A construction for automatically milking animals, such as cows, comprising a shed having a milking parlor with a milking robot and an area having regions where animals to be milked and have been milked can freely move about, said area where the animals can move freely including a system of one-way portals, the construction further comprising an outdoor enclosure where the animals can graze, said shed being connected to said enclosure by two of said one-way portals, one of said connecting portals being one-way from one of said regions of said area into said enclosure, and a further of said portals being one-way from said enclosure into another said region of said area, said portals defining the path and the direction in which the animals can walk to said milking parlor from said enclosure through said another region of said area and to said enclosure from said milking parlor through said one region of said area.

2. A construction as claimed in claim 1, wherein said area includes cubicles for feeding the animals.

3. A construction as claimed in claim 1, wherein said path comprises a circuit through said regions of said area in said shed and said outdoor enclosure of such length whereby the animals can be expected to travel said path in the same direction three times a day.

4. A construction as claimed in claim 3, comprising a radio system having an aerial and a loudspeaker attached to each animal, said aerial receiving signals and said loudspeaker transmitting said signals to encourage animals by sounds from the loudspeaker to move in one direction through said regions in said area in said shed and said outdoor enclosure to be milked three times a day by said robot in said milking parlor.

5. A construction as claimed in claim 4, wherein said enclosure comprising two further regions divided by said one-way portals, the construction further comprising detection means for detecting the number of animals in each said region and determining if there are too many animals in one of said regions, said detection means associated with said signal means whereby the animals are encouraged by sounds from the loudspeaker to move in one direction through the regions of said area in said shed and from one said further region to another said further region in said one direction.

6. A construction as claimed in claim 5, comprising a collar attached to each animal, said collar comprising said radio system.

7. A construction as claimed in claim 5, wherein said radio system encourages the animals to travel around said circuit and be received in said milking parlor three times a day.

8. A construction as claimed in claim 7, wherein said radio system encourages the animals to walk into said milking parlor to be milked three times a day so that the intervals between consecutive milkings of each animal are approximately seven hours.

9. A construction as claimed in claimed 5, wherein the milking time of an animal by said milking robot is approximately six to eight minutes.

10. A construction as claimed in claim 5, wherein said milking parlor comprises two side-by-side compartments.

11. A construction as claimed in claim 10, wherein said milking robot includes a robot head carrying four teat cups, said robot head being movably arranged to be positioned to milk an animal in one of said compartments and thereafter to be positioned to milk an animal in the other of said compartments.

12. A construction for automatically milking animals, such as cows, comprising a shed having in one part a milking parlor including a milking robot for automatically milking animals, and in another part an area where the animals can freely move about, said area having plurality of cubicles for feeding the animals, said area comprising two regions and a system of one-way portals connecting said one part and said another part and connecting said regions in said another part and defining a one-way pathway for the animals from said milking parlor into slid area having cubicles, through said regions in said area having cubicles, and from said area having cubicles into said milking parlor.

13. A construction as claimed in claim 12, wherein said one-way portals comprise dual doors or gates.

14. A construction as claimed in claim 12, wherein a counting device is associated with said one-way portals.

15. A construction as claimed in claim 12, comprising computer means determining the number of animals in an area between said one-way portals and, with the aid of said computer means a higher or lower number of animals is allowed to enter such an area by closing the corresponding said one-way portal or by leaving same open.

16. A construction as claimed in claim 12, wherein said milking parlor comprises a compartment for milking the animals, a cleaning member for cleaning the teats of the animals which are milked, said cleaning member comprising a rotatable shaft which extends in the longitudinal direction of said milking compartment and has cleaning elements extending normally therefrom.

17. A construction as claimed in claim 16, wherein said cleaning elements comprise textile discs.

18. A construction as claimed in claim 16, wherein said cleaning member comprises manipulation means for moving it in said longitudinal direction and the opposite direction.

19. A construction as claimed in claim 16, wherein said cleaning member comprises a water receptacle.

20. A construction as claimed in claim 19, comprising a water supply line under said water receptacle.

21. A construction as claimed in claim 12, wherein there are sufficient said cubicles in said area whereby the construction is suitable for feeding and milking a herd of approximately sixty cows three times a day.

22. A construction as claimed in claim 12, wherein said milking parlor comprises two side-by-side milking compartments and includes a cleaning member for cleaning the teats and udders of the animals therein, said cleaning member being disposed between said two milking compartments and pivotably movable to clean the teats and udders of animals in either of said milking compartments.

23. A construction as claimed in claim 22, wherein said cleaning member is rotatable about an axis extending in the longitudinal direction of either of said milking compartments within which it has been pivoted.

24. A construction for milking animals, such as cows, comprising a milking parlor and a milking robot having a robot head which carries one or more teat cups, characterized in that the milking parlor includes at least two adjacently arranged milking compartments and the milking robot is set-up in such a manner that in a first of said compartments the robot head can enter from one side and in a second of said compartments from another side.

25. A construction as claimed in claim 24, characterized in that the milking box parlor comprises two compartments arranged beside each other, whereas the milking robot can enter the first compartment from a right-hand side and in the second compartment from a left-hand side.

26. A construction as claimed in claim 25, where rails are provided between said two milking compartments, along which rails said milking robot can be moved.

27. A construction as claimed in claim 26, comprising a frame which is movable along said rails and is adjustable in height, said robot head being attached to said frame in a manner that it can be pivoted into both said compartments.

28. A construction as claimed in claim 27, comprising a piston and cylinder component for moving said frame along said rails.

29. A construction as claimed in claim 27, comprising a parallelogram structure which is operative in a predominantly vertical plane and includes a robot head carrier which is adjustable in height by means of a piston and cylinder unit.

30. A construction as claimed in claim 29, comprising a further parallelogram structure which is operative in a predominantly horizontal plane and with the aid of which said robot head is connected to said carrier to be pivotal into both said compartments.

31. A construction as claimed in claim 30, wherein said further parallelogram structure comprises a piston and cylinder combination which is arranged to rotate said robot head about a substantially vertical axis relative to said frame.

32. A construction as claimed in claim 31, comprising a piston and cylinder assembly connected to said frame for pivoting said robot head selectively into both said compartments.

33. A construction as claimed in claim 24, wherein said compartments are arranged so that, during milking of an animal in one compartment, another animal can enter the other compartment, and so that both animals are milked one after the other by the same set of said teat cups.

34. A construction as claimed in claim 24, comprising at least one sensor means for performing the function of determining the distance between said robot head and the legs of an animal present in said compartment.

35. A construction as claimed in claim 34, wherein said at least one sensor means is mounted on said robot head.

36. A construction as claimed in claim 35, wherein said at least one sensor means comprises a laser telemeter.

37. A construction as claimed in claim 36, wherein said laser telemeter is accommodated on a laser unit positioned on said robot head.

* * * * *

UNITED STATES PATENT AND TRADEMARK OFFICE
CERTIFICATE OF CORRECTION

PATENT NO. : 5,596,945
DATED : January 28, 1997
INVENTOR(S) : CORNELIS VAN DER LELY It is certified that error appears in the above-identified patent and that said Letters Patent is hereby corrected as shown below:

On the cover page, before "[63] Continuation of PCT/NL93/00223, Nov. 1, 1993, published as WO94/00616, May 11, 1994." and before INID Code "[51]", please insert the following:

--[30] FOREIGN APPLICATION PRIORITY DATA
   Nov. 2, 1992 [NL] Netherlands............9201902
   Feb. 18, 1993 [NL] Netherlands...........9300307--.

Signed and Sealed this

Thirteenth Day of May, 1997

Attest:

BRUCE LEHMAN

Attesting Officer

Commissioner of Patents and Trademarks